United States Patent
Krueger

(10) Patent No.: US 8,632,105 B2
(45) Date of Patent: Jan. 21, 2014

(54) TENSION CLAMP

(75) Inventor: Manfred Krueger, Buedingen (DE)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 13/362,663

(22) Filed: Jan. 31, 2012

(65) Prior Publication Data

US 2012/0200083 A1  Aug. 9, 2012

(30) Foreign Application Priority Data

Feb. 9, 2011  (DE) .......................... 10 2011 010 655

(51) Int. Cl.
  *F16L 25/00*  (2006.01)

(52) U.S. Cl.
  USPC .............. 285/420; 285/367; 285/410; 24/279

(58) Field of Classification Search
  USPC ............ 285/367, 410, 420, 223; 24/279, 280, 24/284, 285
  See application file for complete search history.

(56) References Cited

U.S. PATENT DOCUMENTS

| | | | | |
|---|---|---|---|---|
| 1,684,666 A | * | 9/1928 | Frazier | 285/420 |
| 2,323,823 A | * | 7/1943 | Markey | 285/410 |
| 2,688,170 A | * | 9/1954 | Balzer | 285/410 |
| 2,703,722 A | * | 3/1955 | Christophersen | 285/367 |
| 2,834,087 A | * | 5/1958 | Herman | 285/367 |
| 4,810,145 A | | 3/1989 | Villas | |
| 4,819,307 A | * | 4/1989 | Turner | 24/274 R |
| 5,170,540 A | * | 12/1992 | Oetiker | 24/284 |
| 5,410,781 A | | 5/1995 | Anjos et al. | |
| 5,967,725 A | | 10/1999 | Voges | |
| 7,401,819 B2 | * | 7/2008 | Gibb et al. | 285/367 |
| 7,533,910 B2 | * | 5/2009 | Ma et al. | 285/420 |
| 7,828,340 B2 | * | 11/2010 | Heelan et al. | 285/410 |
| 8,186,643 B2 | * | 5/2012 | Luo et al. | 285/410 |
| 2006/0170215 A1 | * | 8/2006 | Cousineau | 285/420 |
| 2006/0239795 A1 | | 10/2006 | Jaconelli et al. | |
| 2012/0256418 A1 | * | 10/2012 | Horgan | 285/420 |

FOREIGN PATENT DOCUMENTS

| | | |
|---|---|---|
| DE | 19 70 303 | 10/1967 |
| DE | 29 19 939 A1 | 11/1980 |
| DE | 202 04 617 | 8/2002 |
| DE | 102006048053 | 4/2008 |
| DE | 102008001443 | 11/2009 |
| FR | 2 509 421 A3 | 1/1983 |
| GB | 2 104 584 | 3/1983 |
| GB | 2 400 154 A | 10/2004 |
| JP | 53-135616 | 3/1952 |

(Continued)

OTHER PUBLICATIONS

German Search Report/Office Action dated Aug. 8, 2011 conducted in counterpart German AppLn. No. 10 2011 010 655.3.
Search report from European Patent Office (EPO), Application No. 11009231.9, mail date is Jun. 21, 2012, with partial-English-language translation.

(Continued)

*Primary Examiner* — David E Bochna
(74) *Attorney, Agent, or Firm* — Greenblum & Bernstein, P.L.C.

(57) ABSTRACT

Tension clamp and a method of clamping with the tension clamp. The tension clamp includes a clamping band formed in an annular manner with two ends adjacent to one another, and a clamping fixture, structured and arranged to connect the two ends to one another, comprising a tightening screw with a screw head and a mounting section and a mating thread element into which the tightening screw is screwable. The mounting section includes at least one flexible region along its length.

20 Claims, 1 Drawing Sheet

(56) References Cited

FOREIGN PATENT DOCUMENTS

| | | |
|---|---|---|
| JP | 60-122089 | 8/1985 |
| JP | 6-69558 | 9/1994 |
| JP | 7-1395 | 1/1995 |
| JP | 09-177747 | 7/1997 |
| JP | 2000-314485 | 11/2000 |
| JP | 2009-008220 | 1/2009 |
| JP | 2010-133447 | 6/2010 |

OTHER PUBLICATIONS

Japanese OA in counterpart application No. JP2012-024900 dated Apr. 9, 2013 (with English-language translation).

Korea Office action in counterpart application No. 10-2012-0012284, dated May 10, 2013 along with an english translation thereof.

Japanese Office action in counterpart application No. 2012-024900, dated Aug. 20, 2013, along with an english translation thereof.

* cited by examiner

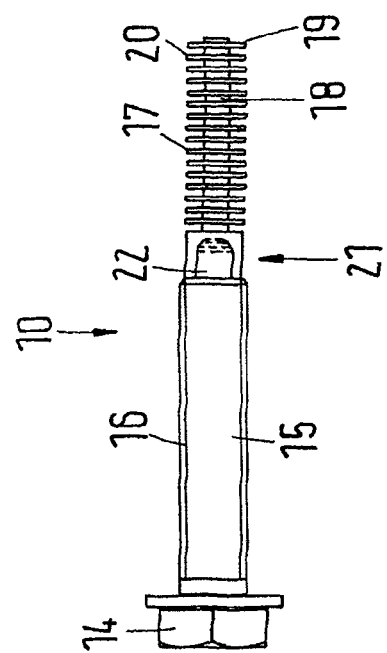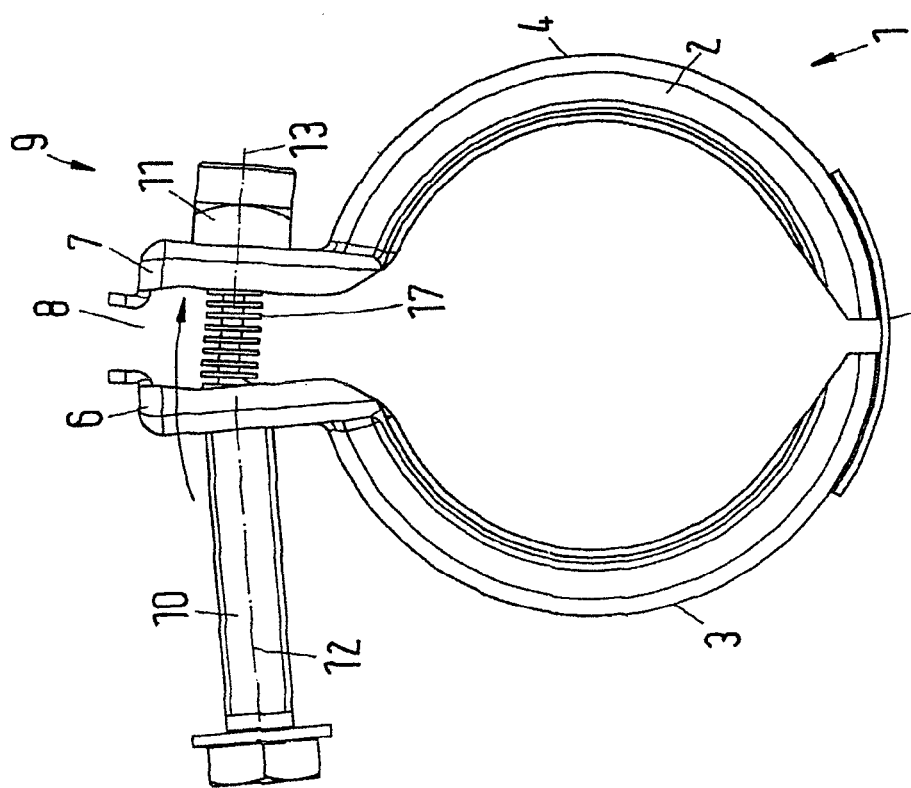

TENSION CLAMP

CROSS-REFERENCE TO RELATED APPLICATIONS

The present application claims priority under 35 U.S.C. §119 of German Patent Application No. 10 2011 010 655.3, filed on Feb. 9, 2011, the disclosure of which is expressly incorporated by reference herein in its entirety.

BACKGROUND OF THE INVENTION

1. Field of the Invention

The invention relates to a tension clamp with a clamping band embodied or formed in an annular manner having two ends adjacent to one another, which can be connected to one another by a clamping fixture. The clamping fixture has a tightening screw with a screw head and a mounting section and a mating thread element, with which the tightening screw can be screwed.

2. Discussion of Background Information

A tension clamp of this type is used, for example, in order to connect two pipes to one another. One possibility lies in inserting one end of a pipe into the end of another pipe. The tension clamp is then used to clamp the outer pipe firmly on the inner pipe. In another example, the tension clamp is embodied or formed or formed as a profile clamp. A profile clamp is used in order to connect two pipes bearing against one another on the front face to one another, which pipes are provided with conical flanges, via which the tension clamp grips.

As a rule, for fitting the tension clamp it is necessary for the tension clamp to be bent upwards in order to enable it to be fitted onto the pipes. To this end it is necessary for the tightening screw and the mating thread element to be separate from one another so that an opening is available in the tension clamp. When the two ends of the clamping band are moved towards one another again, the tightening screw must be brought into engagement with the mating thread element. This is generally not very easy, because the direction of the thread of the tightening screw and the mating thread element no longer coincide with sufficient exactness after the clamping band has been bent upwards and the ends of the clamping band have been bent apart.

Solutions for preassembly (pre-suspension) have hitherto been proposed in which latch hooks or special clamping head geometries have been used. Numerous tests for functional inspections with minimum and maximum tolerances are still necessary here.

SUMMARY OF THE INVENTION

Embodiments of the invention facilitate the connection of tightening screw and mating thread element in the fitting of tension clamps.

In embodiments, a tension clamp of the type mentioned at the outset includes a mounting section has at least one flexible region along its length.

With this solution, the tightening screw can be bent on a part of its length, so that the tip of the tightening screw can easily be brought into engagement with the mating thread element and namely in such a manner that the thread direction of the mating thread element coincides with the direction of the end of the tightening screw which comes into engagement with the mating thread element. As soon as an engagement of this type has been produced, the tightening screw can be turned further with respect to the mating thread element in order to clamp the tension clamp. A tension clamp of this type can also be pre-fitted in that only the end of the mounting section is brought into engagement with the mating thread element, so that the inner diameter of the tension clamp is still relatively large. In many cases the tension clamp can be prepositioned in this condition.

Preferably, the flexible region is embodied or formed or formed at an end of the mounting section which is facing away from the screw head. During fitting, the mounting section can then be bent where it is necessary, namely in the region of the mating thread element. For this purpose it is fundamentally sufficient to deform or bend the tip of the mounting section which is facing towards the mating thread element in order to bring the mounting section into engagement with the mating thread element. The rest of the mounting section can be kept non-deformable.

Preferably, the flexible region is embodied or formed on an extension which is connected to a shank of the tightening screw. A conventional tightening screw can then be used and this can be provided with a flexible region.

It is hereby preferred that the extension has a length in which in the tightened state of the tension clamp the mating thread element is in engagement with the shank. The flexible region, i.e., the extension, is used merely in order to bring the tightening screw and the mating thread element into engagement with one another and optionally to move the two ends of the tension strap towards one another. As soon as a greater force is necessary for this movement, the mating thread element is already in engagement with the shank, so that the necessary forces can also be applied. There is basically no danger that the extension will be thereby damaged. Instead, the extension can be used as a safety feature. If higher forces are already applied although the shank is not yet in engagement with the mating thread element, the extension can easily tear, become detached from the shank or with its mounting geometry lose engagement with the mating thread element. This is a clear indication that the tension clamp was mounted incorrectly.

Preferably, the extension and the shank are made from different materials, in particular the shank from a metal and the extension from a plastic. The metal of the shank can absorb to a sufficient extent forces that are necessary to tighten the tension clamp. The plastic can be selected to be so flexible that the tightening screw can be deformed in its flexible region such that the threading of the tightening screw into the mating thread element is facilitated.

Preferably, on one of the two parts shank or extension a projection is embodied or formed, which engages in a recess on the other of the two parts extension or shank. With this embodiment an improved connection between extension and shank is obtained, i.e., not only the front face of the extension and shank is available as a connection surface, but additional connection surfaces are obtained through the circumferential surfaces of the projection and recess.

Preferably, the projection and the recess have a cross-sectional geometry transmitting a torque. This can be easily achieved, for example, in that the projection has a polygonal cross section and the recess is embodied or formed in a corresponding manner. In this case, a rotation of the shank is transmitted to the extension with sufficient torque so that the danger of shearing off the extension from the shank can be kept low.

Preferably, the extension and the shank are connected to one another by adhesion, compression or shrinking on. All of these connection methods require a relatively low expenditure. Alternatively, it can be provided that the extension is sprayed onto the shank. In this case, the tightening screw is placed with its shank into an injection mold and the extension is produced in that a corresponding plastic is injected into the injection mold.

Preferably, the mounting section has a smaller diameter in the flexible region than in a region outside the flexible region, wherein the smaller diameter is so large that it comes into engagement with a thread on the mating thread element. Since basically no clamping forces are to act via the flexible region between the mating thread element and the tightening screw, but instead the flexible region is to be used only for threading the tightening screw into the mating thread element, the engagement between the mating thread element and the extension can be embodied or formed to be somewhat weaker. The smaller diameter of the mounting geometry on the flexible region, however, facilitates the threading of the tightening screw into the mating thread element.

It is also advantageous if the mounting section has a thread outside the flexible region and in the flexible region blades are provided which form a mounting geometry. The flexible region can thus have a mounting geometry that differs from a thread and that is not damaged by bending.

Preferably, the tension clamp is embodied or formed as a profile clamp. A profile clamp as a rule must be bent open relatively wide in order to make it possible to mount it at the desired location. Here the threading of the tightening screw into the mating thread element through the flexible region is facilitated to a particular extent.

Embodiments of the invention are directed to a tension clamp that includes a clamping band formed in an annular manner with two ends adjacent to one another, and a clamping fixture, structured and arranged to connect the two ends to one another, comprising a tightening screw with a screw head and a mounting section and a mating thread element into which the tightening screw is screwable. The mounting section includes at least one flexible region along its length.

In accordance with embodiments, the at least one flexible region may be formed at an end of the mounting section facing away from the screw head. The at least one flexible region can be formed on an extension which is connected to a shank of the tightening screw. The extension can have a length in which in the tightened state of the tension clamp the mating thread element is in engagement with the shank. Further, the extension and the shank are made from different materials. The shank can be made from a metal and the extension can be made from a plastic.

According to other embodiments, a projection may be formed on one of the shank or the extension, which engages in a recess formed in the other of the extension or the shank. The projection and the recess can have a cross-sectional geometry transmitting a torque.

In accordance with still other embodiments, the extension and the shank can be connected to one another by one of adhesion, compression or shrinking on.

According to other embodiments, the extension can be sprayed onto the shank.

Still further, a diameter of the flexible region of the mounting section can be smaller than a diameter in a region of the mounting section outside the flexible region. Further, the diameter of the flexible region is large enough to engage with a thread on the mating thread element.

In accordance with still other embodiments of the invention, the mounting section can have a thread outside the flexible region and blades in the flexible region to form a mounting geometry.

According to other embodiments, the tension clamp can be formed as a profile clamp.

Embodiments of the invention are directed to a method for clamping a tubular element with a tension clamp, as described above. The method includes passing the flexible region through one of the two ends, opening the clamping band to receive the tubular element, closing the two ends around the tubular element, and bending the flexible part to extend through the second of the two ends and into the mating thread element.

In accordance with embodiments, the method can also include pressing the flexible part through the mating thread element to align an axis of the mounting section with an axis of the mating thread element.

Embodiments of the invention are directed to a method for clamping a tubular element with a tension clamp having a clamping band with an annular shape and two ends arranged adjacent each other. The method includes opening the clamping band to receive the tubular element, closing the two ends around the tubular element, passing a tightening screw having a flexible region through one of the two ends, and bending the flexible part to extend through the second of the two ends and into a mating thread element.

According to still yet other embodiments of the present invention, the method may further include pressing the flexible part through the mating thread element to align an axis of a non-flexible region of the tightening screw with an axis of the mating thread element. The method may also include turning the tightening screw to connect the two ends together.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein FIG. 1 illustrates a diagrammatic representation of a profile clamp; and FIG. 2 illustrates a diagrammatic representation of a tension clamp.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

FIG. 1 shows a tension clamp embodied or formed as a profile clamp 1. Profile clamp 1 has a clamping band 2 bent in a ring-shaped manner. Clamping band 2 in the present case is formed from two half shells 3, 4, which are connected to one another via a spring bracket 5. Each half shell 3, 4 has an end 6, 7. The two ends 6, 7 are, as shown, adjacent to one another. However, for mounting the profile clamp 1 to a pipe connection they can be moved away from one another such that a gap 8 between the two ends 6, 7 is enlarged to the extent that the mounting of the profile clamp 1 on the pipe connection is possible.

To tighten profile clamp 1, a tightening device 9 is provided, which includes a tightening screw 10 and a mating thread element 11, into which tightening screw 10 can be screwed. In the illustrated embodiments, mating thread element 11 is embodied or formed as a threaded bushing. However, it is understood that it is also possible to provide a nut or the like here, which is held in end 7 of half shell 4. Mating thread element 11 is held in end 7 in a non-rotatable manner.

As is discernible from FIG. 1, the two ends 6, 7 are no longer parallel to one another after being bent upwards and bent together again. For this reason, a thread axis 12 of tightening screw 10 and a thread axis 13 of mating thread element 11 no longer conform to one another. A conformance of this type is necessary, however, in order to be able to screw tightening screw 10 into mating thread element 11.

In order to also be able to carry out this screwing-in easily in the situation shown, a special tightening screw 10 is used, as is shown in FIG. 2.

Tightening screw 10 has a screw head 14, which in the illustrated embodiment is embodied or formed as a hexagon drive. Other embodiments are likewise possible, for example, hexagon socket, slotted, cross recess, torx or the like. Furthermore, tightening screw 10 has a shank 15, which bears an external thread 16. External thread 16 is adapted to an internal thread in mating thread element 11. Tightening screw 10 in the regions of screw head 14 and shank 15, which can be embodied or formed in one piece, as in the illustrated embodiment, is made of a metal.

At the end of shank 15, which faces away from screw head 14, an extension 17 made of a plastic is arranged. Extension 17 has a core 18, which has a diameter that is much smaller than a diameter of the solid part of shank 15, i.e., the diameter of shank 15 less the depth of external thread 16. Thus, it is understood that extension 17 is flexible to form a flexible region of tightening screw 10. In this manner, extension 17 can be bent.

As is shown in FIG. 1, extension 17 can be used to facilitate threading tightening screw 10 into mating thread element 11. To this end, extension 17 is simply bent to such an extent that its thread axis (not shown) can conform to thread axis 13 of mating thread element 11.

In addition to core 18, extension 17 is provided with several parallel blades 19 arranged spaced apart from one another. The spacing preferably corresponds to the spacing of adjacent threads of external thread 16, so that extension 17 likewise bears an attachment geometry 20. This attachment geometry 20, i.e., blades 19, can be suspended in the internal thread of mating thread element 11 and makes it possible to move the two ends 6, 7 towards one another when tightening screw 10 is turned. Blades 19 are oriented to the internal thread and move during the rotation of tightening screw 10 parallel to thread axis 13. However, the outer diameter of external thread 20 is slightly smaller than the outer diameter of external thread 16. This means that the thread engagement between extension 17 and mating thread element 11 is not as loadable as a corresponding thread engagement between mating thread element 11 and shank 15. Extension 17 is therefore dimensioned such that mating thread element 11 is in engagement with external thread 16 on shank 15 as soon as tensile forces have to be applied while tightening tightening screw 10. This is not the case in the threading phase, but only in a tightening phase. The flexible region of tightening screw 10, i.e., extension 17, is therefore not loaded during tightening.

Blades 19 are elastically deformable to a certain extent. It is thus possible to insert extension 17 into mating element 11 and, by applying further pressure, to push it further into mating thread element 11. Blades 19 then slide with partial deformation past the thread of mating thread element 11. This leads to a substantial saving of assembly time. The tip of extension 17 after threading can be quickly pressed through the mating thread element.

If profile clamp 1 is incorrectly mounted, so that tensile forces already occur while mating thread 11 is still in engagement with extension 17, as a rule this means that extension 17 breaks off or the blades 19 come out of engagement with the internal thread, which indicates that profile clamp 1 has been incorrectly mounted.

Extension 17, which is made of a plastic, can be sprayed onto shank 15.

In order to provide a connection point 21 between extension 17 and shank 15 with an improved strength, shank 15 can be provided with a projection 22, which projects into a corresponding recess in extension 17. Projection 22 can have a geometry transferring a torque, for example, it can be embodied or formed as a square or as a hexagon or can bear a multiple-spline profile.

It is also possible to embody or form extension 17 and shank 15 as separate parts and to connect extension 17 and shank 15 to one another in that extension 17 is adhered, is compressed to shank 15, or that the extension is shrunk onto shank 15.

Of course, it is likewise possible to embody or form projection 22 on extension 17 and to provide a corresponding recess in shank 15. The corresponding connection possibilities apply here also.

If projection 22 is embodied or formed on shank 15, then it can be produced relatively easily, for example in that shank 15 is turned away a little at this end.

The invention was explained using the example of a profile clamp. However, in principle it can be applied to other clamps that are to be tightened, e.g., to hose clamps, pipe clamps and the like.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:
1. A tension clamp comprising:
 a clamping band formed in an annular manner with two ends adjacent to one another;
 a clamping fixture, structured and arranged to connect the two ends to one another, comprising a tightening screw with a screw head and a mounting section, and a mating thread element into which the mounting section of the tightening screw is screwable,
 wherein the mounting section includes at least one flexible region along its length.

2. The tension clamp according to claim 1, wherein the at least one flexible region is formed at an end of the mounting section facing away from the screw head.

3. The tension clamp according to claim 2, wherein the at least one flexible region is formed on an extension which is connected to a shank of the tightening screw.

4. The tension clamp according to claim 3, wherein the extension has a length in which in the tightened state of the tension clamp the mating thread element is in engagement with the shank.

5. The tension clamp according to claim 4, wherein the extension and the shank are made from different materials.

6. The tension clamp according to claim 5, wherein the shank is made from a metal and the extension is made from a plastic.

7. The tension clamp according to claim 3, further comprising a projection formed on one of the shank or the extension, which engages in a recess formed in the other of the extension or the shank.

8. The tension clamp according to claim 7, wherein the projection and the recess have a cross-sectional geometry transmitting a torque.

9. The tension clamp according to claim 3, wherein the extension and the shank are connected to one another by one of adhesion, compression or shrinking on.

10. The tension clamp according to claim 3, wherein the extension is molded onto the shank.

11. The tension clamp according to claim 1, wherein a diameter of the flexible region of the mounting section is smaller than a diameter in a region of the mounting section outside the flexible region.

12. The tension clamp according to claim 11, wherein the diameter of the flexible region is large enough to engage with a thread on the mating thread element.

13. The tension clamp according to claim 1, wherein the mounting section has a thread outside the flexible region and blades in the flexible region to form a mounting geometry.

14. The tension clamp according to claim 1 being formed as a profile clamp.

15. A method for clamping a tubular element with a tension clamp according to claim 1, comprising:
   passing the flexible region through one of the two ends;
   opening the clamping band to receive the tubular element;
   closing the two ends around the tubular element; and
   bending the flexible part to extend through the second of the two ends and into the mating thread element.

16. The method according to claim 15, further comprising:
   pressing the flexible part through the mating thread element to align an axis of the mounting section with an axis of the mating thread element.

17. A method for clamping a tubular element with a tension clamp having a clamping band with an annular shape and two ends arranged adjacent each other, the method comprising:
   opening the clamping band to receive the tubular element;
   closing the two ends around the tubular element;
   passing a tightening screw having a flexible region through one of the two ends;
   bending the flexible part to extend through the second of the two ends and into a mating thread element.

18. The method according to claim 17, further comprising pressing the flexible part through the mating thread element to align an axis of a non-flexible region of the tightening screw with an axis of the mating thread element.

19. The method according to claim 18, further comprising turning the tightening screw to connect the two ends together.

20. A tension clamp comprising:
   a clamping band formed in an annular manner with two ends adjacent to one another;
   a clamping fixture, structured and arranged to connect the two ends to one another, comprising a tightening screw with a screw head and a mounting section, and a mating thread element into which the mounting section of the tightening screw is screwable,
   wherein the mounting section includes at least one flexible region along its length, structured and arranged, so that through a bending of the flexible region, a tip of the tightening screw is engageable with the mating thread element.

* * * * *